US009683686B2

(12) United States Patent
Osborne et al.

(10) Patent No.: US 9,683,686 B2
(45) Date of Patent: Jun. 20, 2017

(54) AUTO-DRAINING FILTER APPARATUS (71) Applicant: American Air Filter Company, Inc., Louisville, KY (US)

(72) Inventors: Michael W. Osborne, Louisville, KY (US); James Ross, Newcastle upon Tyne (GB)

(73) Assignee: American Air Filter Company, Inc., Louisville, KY (US)

( * ) Notice: Subject to any disclaimer, the term of this patent is extended or adjusted under 35 U.S.C. 154(b) by 116 days.

(21) Appl. No.: 14/570,830

(22) Filed: Dec. 15, 2014

(65) Prior Publication Data

US 2016/0166955 A1    Jun. 16, 2016

(51) Int. Cl.
| | | |
|---|---|---|
| *B01D 24/00* | (2006.01) | |
| *B01D 43/00* | (2006.01) | |
| *B01D 25/00* | (2006.01) | |
| *B01D 36/04* | (2006.01) | |
| *B01D 27/00* | (2006.01) | |
| *F16L 21/00* | (2006.01) | |
| *B01D 46/00* | (2006.01) | |
| *B01D 46/12* | (2006.01) | |

(52) U.S. Cl.
CPC .......... *F16L 21/00* (2013.01); *B01D 46/0023* (2013.01); *B01D 46/0031* (2013.01); *B01D 46/12* (2013.01); *B01D 2277/20* (2013.01)

(58) Field of Classification Search
CPC .............. B01D 46/0005; B01D 46/521; B01D 46/0002; B01D 46/002; B01D 2258/06; B01D 2325/38; B01D 46/0031; F02B 37/16; F02B 29/0475; F02B 29/0468; F02C 7/052; F02C 7/05

See application file for complete search history.

(56) References Cited

U.S. PATENT DOCUMENTS

| | | | | |
|---|---|---|---|---|
| 4,622,050 A | * | 11/1986 | O'Connor .......... | B01D 46/0068 55/283 |
| 4,830,643 A | * | 5/1989 | Sassa ................. | B01D 53/0407 55/522 |
| 6,872,305 B2 | * | 3/2005 | Johnson ................. | B01D 61/20 210/257.2 |
| 7,419,524 B2 | | 9/2008 | Caesar et al. | |
| 7,513,996 B2 | * | 4/2009 | Kloos .................. | B01D 61/022 210/249 |
| 7,540,897 B2 | | 6/2009 | Stahl et al. | |
| 8,303,678 B2 | | 11/2012 | Steele et al. | |

(Continued)

FOREIGN PATENT DOCUMENTS

| | | |
|---|---|---|
| WO | 03097214 | 11/2003 |
| WO | 2012044662 | 4/2012 |
| WO | 2012164084 | 12/2012 |

OTHER PUBLICATIONS

European Patent Office, International Search Report and Written Opinion for PCT/US2015/065803 Mar. 24, 2016.

(Continued)

*Primary Examiner* — Ana Fortuna
(74) *Attorney, Agent, or Firm* — Middleton Reutlinger (57) ABSTRACT

An apparatus having one or more filters positioned by a connection member. The connection member orientates one or more filters at a transverse angle relative to the horizontal to drain contaminants from the filter.

18 Claims, 7 Drawing Sheets

(56) References Cited

U.S. PATENT DOCUMENTS

| | | | |
|---|---|---|---|
| 8,540,805 B2* | 9/2013 | Jarrier | B01D 46/0021 55/378 |
| 2007/0294985 A1 | 12/2007 | Leseman et al. | |
| 2008/0307759 A1* | 12/2008 | Reichter | B01D 46/0005 55/428 |
| 2010/0251679 A1* | 10/2010 | Kawano | B01D 46/0001 55/483 |
| 2010/0307118 A1* | 12/2010 | Kawano | B01D 39/1692 55/483 |
| 2016/0166955 A1* | 6/2016 | Osborne | B01D 29/96 210/335 |

OTHER PUBLICATIONS

Gas Machinery Research Council Southwest Research Institute; Guideline for Gas Turbine Inlet Air Filtration Systems Apr. 1, 2010.
Viledon, Viledon air intake systems Superior filtration for optimum turbine performance, pp. 1-4, Oct. 1, 2012, Weinheim, Germany.

* cited by examiner

AUTO-DRAINING FILTER APPARATUS

TECHNICAL FIELD

The present embodiment is directed to an auto-draining filter apparatus. The auto-drain feature removes contaminants, such as but not limited to water, from one or more filters.

BACKGROUND

In offshore, marine, or coastal gas turbine applications, such as but not limited to oil platforms and vessels, salt water spray may flood the inlet air filters to a gas turbine. Various filters have been proposed in the art to mitigate the effects of the sea water spray. For example, a microglass filtration media with a water repellent coating has been used to provide impingement points for the water to strike, and the water repellent coating aids in the coalescence and shedding of the sea water. However, this design of filter is mounted generally level in the horizontal flow direction, thus collecting the shed water in the bottom of the filter. This collected water is forced back into the filter by the entering air thereby blocking a portion of air filtration of the filter. Thus, the efficiency of the filter can be reduced if the filter becomes wet and continues to be saturated.

It is of importance that the air filters coalesce the water droplets and remove or reduce the water's impact so as to keep the filter media clear in order that the water does not saturate the media resulting in a high pressure event that is adverse to the operation of the gas turbine engine.

SUMMARY

In one aspect, one embodiment includes a connection member for positioning one or more filters. The connection member includes a top side, a bottom side, and a pair of lateral sides interconnecting the top side and the bottom side. The connection member further includes an upstream facing side orthogonal to the top side, bottom side, and the pair of lateral sides, wherein the upstream facing side defines a downwardly facing upstream opening adapted to engage one or more prefilters. The connection member further includes a downstream facing side orthogonal to the top side, bottom side, and the pair of lateral sides, wherein the downstream facing side defines an upwardly facing downstream opening adapted to engage one or more final filters. The upstream opening is in air flow communication with the downstream opening. The connection member adjacent the downstream facing side may taper from the bottom side to the top side. The connection member adjacent the upstream facing side may taper from the top side to the bottom side. The connection member may include an upstream member in a nesting relationship with a downstream member, wherein the upstream member includes the downwardly facing upstream opening and the downstream member includes the upwardly facing downstream opening. The connection member may further include one or more reservoirs. The one or more reservoirs may be adjacent the downstream facing side of the connection member. The connection member may include one or more prefilters upstream of the connection member and one or more final filters downstream of the connection member.

In another aspect, one embodiment of the filter apparatus may include one or more prefilters having an upstream opening and a downstream opening. As well as one or more final filters having an upstream opening and a downstream opening with the one or more final filters being downstream of the one or more prefilters. A connection member includes an upstream opening and a downstream opening in air flow communication with the one or more prefilters and the one or more final filters. The connection member is downstream of the one or more prefilters and upstream of the one or more final filters. The connection member upstream opening is orientated downwardly facing in relation to the horizontal axis and the connection member downstream opening is orientated upwardly facing relative to the horizontal axis. The connection member may include one or more reservoirs. One reservoir may be adjacent the connection member downstream opening. Further the connection member may be a two piece component that includes an upstream member defining the upstream opening and a downstream member defining the downstream opening. The upstream opening of one or more prefilters and the upstream opening of one or more final filters may be orientated downwardly facing relative to the horizontal axis. Further the downstream opening of one or more prefilters and the downstream opening of one or more final filters may be orientated upwardly facing relative to the horizontal axis. One or more prefilters may be releasably connected to the connection member. The connection member may have an upstream facing side and a downstream facing side interconnected with a top side and a bottom side. Further the connection member adjacent the upstream facing side tapers from the top side to the bottom side and the connection member adjacent the downstream facing side tapers from the bottom side to the top side.

In another aspect, one embodiment includes a filter apparatus having one or more filters and a connection member. At least one of the one or more filters may include a frame and filter media defining an upstream opening and a downstream opening. The frame has at least a bottom wall with the upstream opening and the downstream opening substantially perpendicular to the bottom wall. The connection member orientates the frame bottom wall at a transverse angle relative to the horizontal axis wherein the upstream opening of at least one filter is downwardly facing and the downstream opening of at least one filter is upwardly facing. The connection member may have one or more reservoirs. At least one filter is a prefilter upstream of the connection member. Further at least one filter is a final filter downstream of the connection member. The connection member can include an upstream opening and a downstream opening, wherein at least one of the upstream opening or the downstream opening of the connection member is parallel to the upstream opening and the downstream opening of at least one filter. Further at least one filter can rotate relative to the connection member between a first rotational position and a second rotational position. The connection member may have an upstream member and a downstream member.

Other objects and advantages of one or more embodiments will become apparent from the following description taken in connection with the accompanying drawings, wherein some embodiments of this invention are set forth by way of illustration and examples.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," "in communication with" and "mounted," and variations thereof herein are used broadly and encompass direct and indirect connections, couplings, and mountings. In addition, the terms "connected" and "coupled" and variations thereof are not restricted to physical or mechanical connections or couplings.

Furthermore, and as described in subsequent paragraphs, the specific mechanical and fluid configurations illustrated in the drawings are intended to exemplify embodiments of the invention and that other alternative embodiments are possible.

As shown in Figures, a filter apparatus or assembly 20 may include one or more filters, such as a downstream or final filter 30 and an upstream filter and/or prefilter 40, generally orientated by a connection member 50. One or more filter apparatuses 20 may be used together for a desired application. The apparatus 20 may include one or more passageways 31, 41 allowing accumulated contaminants to drain away from one or more filters and removed from the apparatus 20. Alternatively, the contaminants may be drained to a desired location within the apparatus 20. The contaminants may be a fluid, such as but not limited to water. For instance, the contaminants may be solids alone or a combination of liquid and particulates, such as but not limited to salt water. The passageways may be of a variety of shapes, sizes, orientations, constructions, quantities, and positions within the apparatus and still be within the scope of the teachings herein.

As shown in one embodiment, the prefilter or first filter member 40 may include one or more connected filters such as a removable prefilter 42 connected to another prefilter or mid-range filter 43. Alternatively, the removable prefilter 42 may be nonremoveable or permanently fixed to the remainder of the prefilter. Each prefilter 40 may contain a filter media 40a with a frame 40b. The frame 40b may surround the filter media 40a pattern. If a removable prefilter 42 is used, the removable prefilter 42 may be a 2 inch filter with synthetic hydrophobic filter pack. The mid-range filter 43 may be a 12 inch fixed potted (sealed) hydrophobic media pack with either a deep aluminum separator pleat, deep embossed pleat, and/or a mini-pleat V-bank. It is to be understood that the prefilter 40 may include a frame and filter media of a variety of shapes, sizes, orientations, constructions, and quantities which may be used and still be within the scope of the teachings herein.

The final filter or second filter member 30 may include one or more connected filters, however the final filter 30 is shown individually in one embodiment within the figures. The final filter 30 may contain a filter media 30a with a frame 30b. The frame 30b may surround the filter media 30a pattern. Further, the filter media's filtering properties of the final filter 30 may be different from the prefilter 40. Alternatively, it is understood that the filtering properties of the final filter 30 and the prefilter 40 may be similar. The final filter 30 may be a 12 or 17 inch fine range filter with a fixed potted (sealed) hydrophobic media pack with either a deep aluminum separator pleat, deep embossed pleat, and/or a mini-pleat V-bank. The media 30a of the filter apparatus may be of a coarse fiberglass, microglass, or synthetic materials such as but not limited to polyester, polyethylene, polypropylene, or polytetrafluroethylene. It is to be understood that the final filter 30 may include a frame and filter media of a variety of shapes, sizes, orientations, constructions, and quantities which may be used and still be within the scope of the teachings herein.

Figure 1:
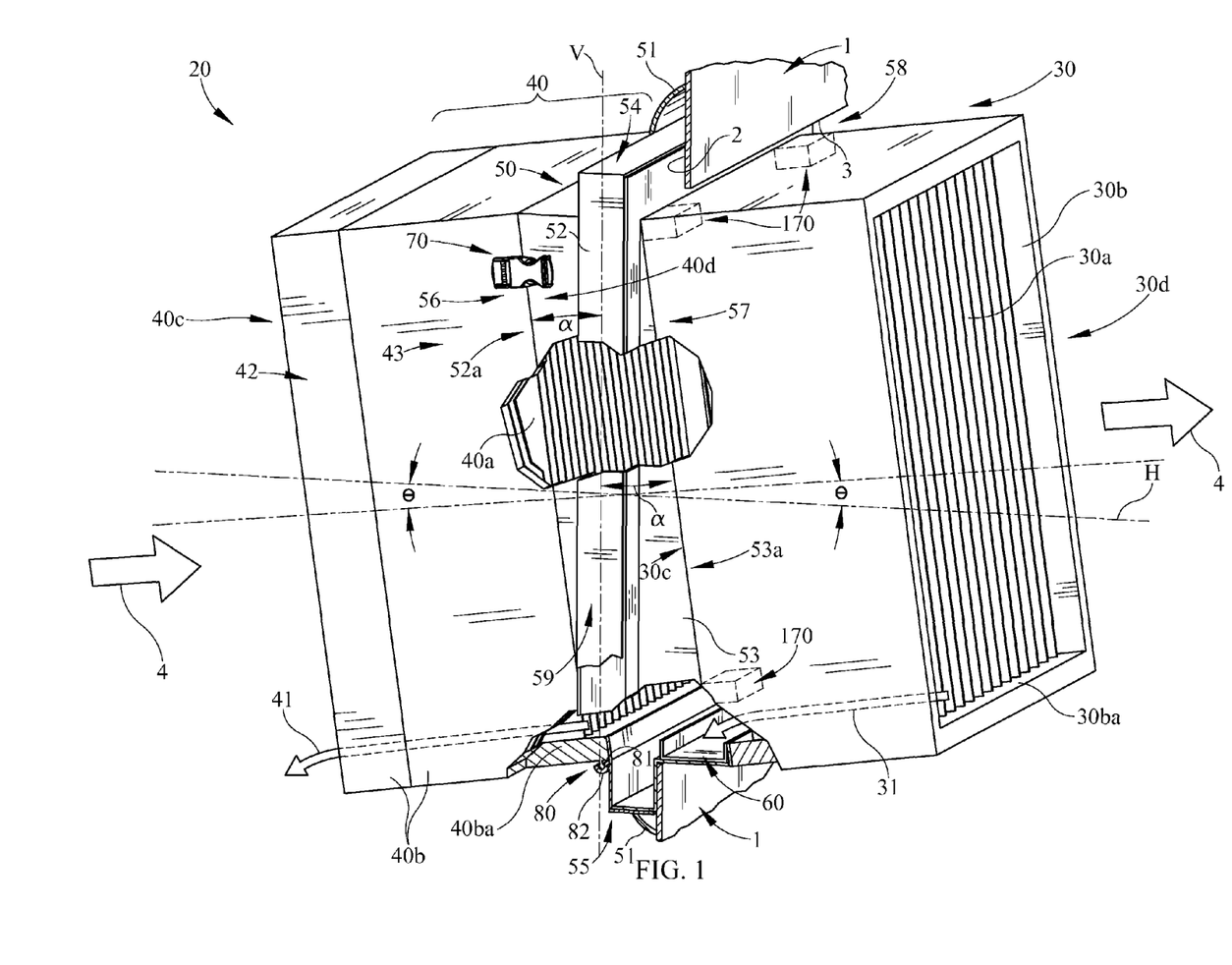
FIG. 1 is a perspective view of one embodiment of the filter apparatus.
Figure 2:
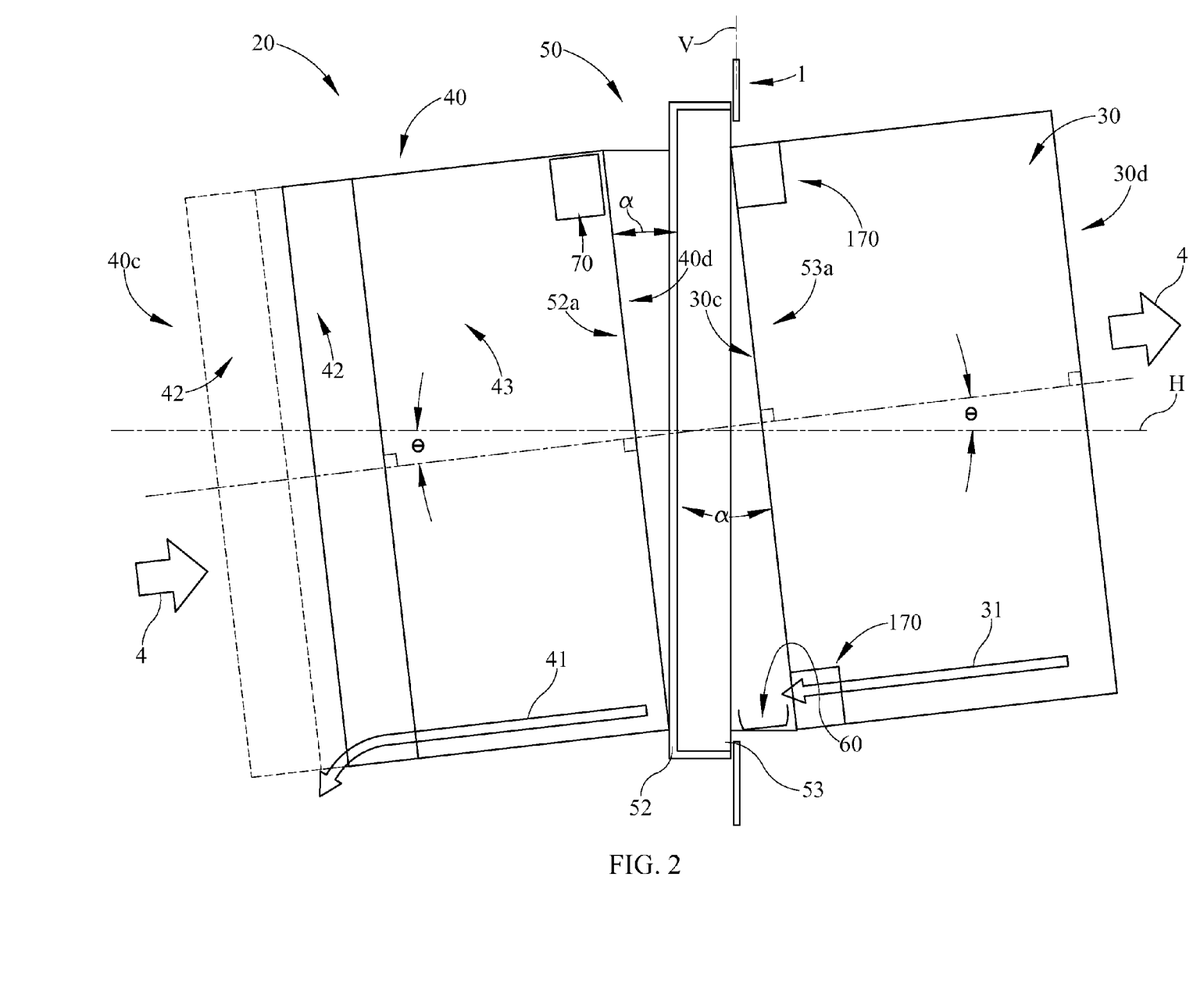
FIG. 2 is a schematic side view of the filter apparatus of FIG. 1 with the removable prefilter shown in a engaged position with the mid-range filter and the removable prefilter in a disengaged position with the mid-range filter.
Figure 3:
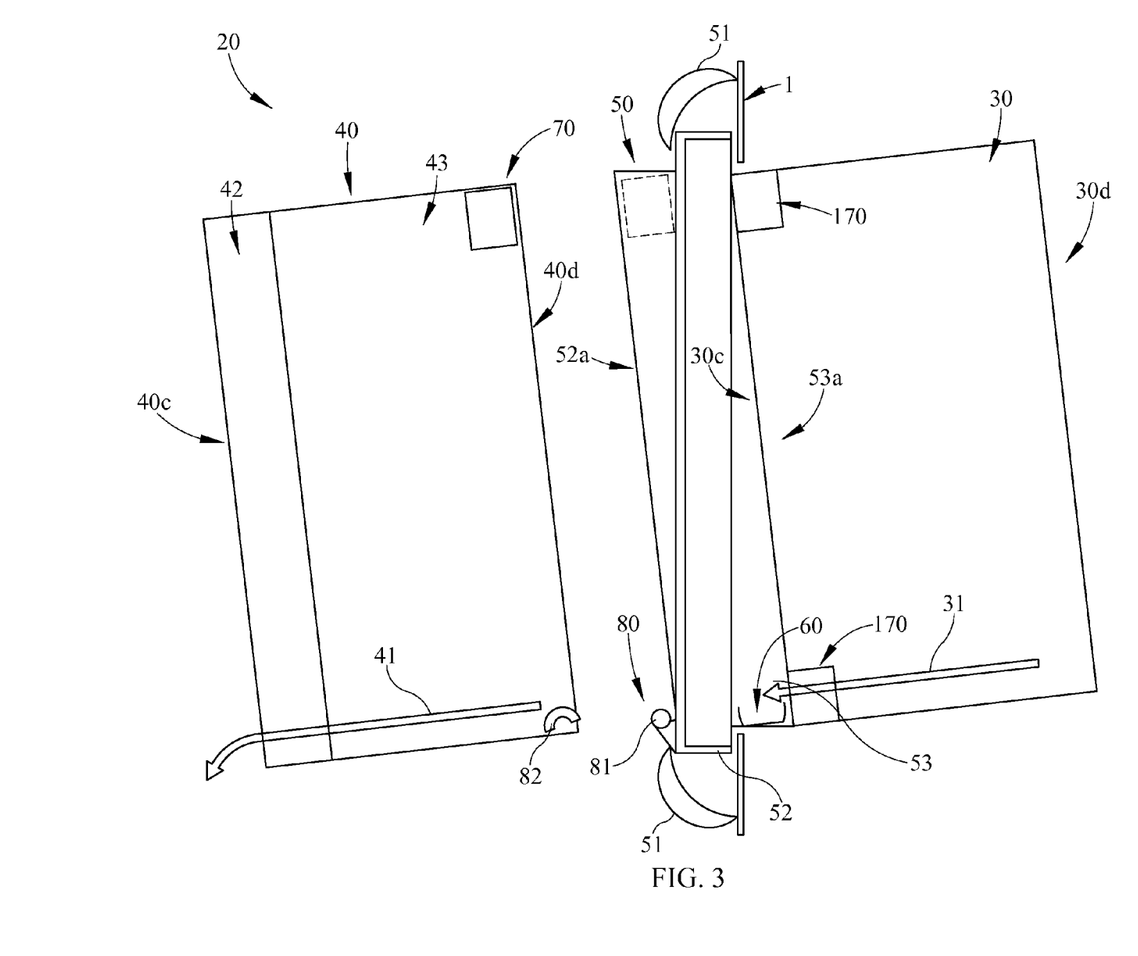
FIG. 3 is a schematic side view of the filter apparatus of FIG. 1 with the prefilter disengaged from the connection member and the connection member mounted to the gas turbine filter housing wall.
Figure 4:
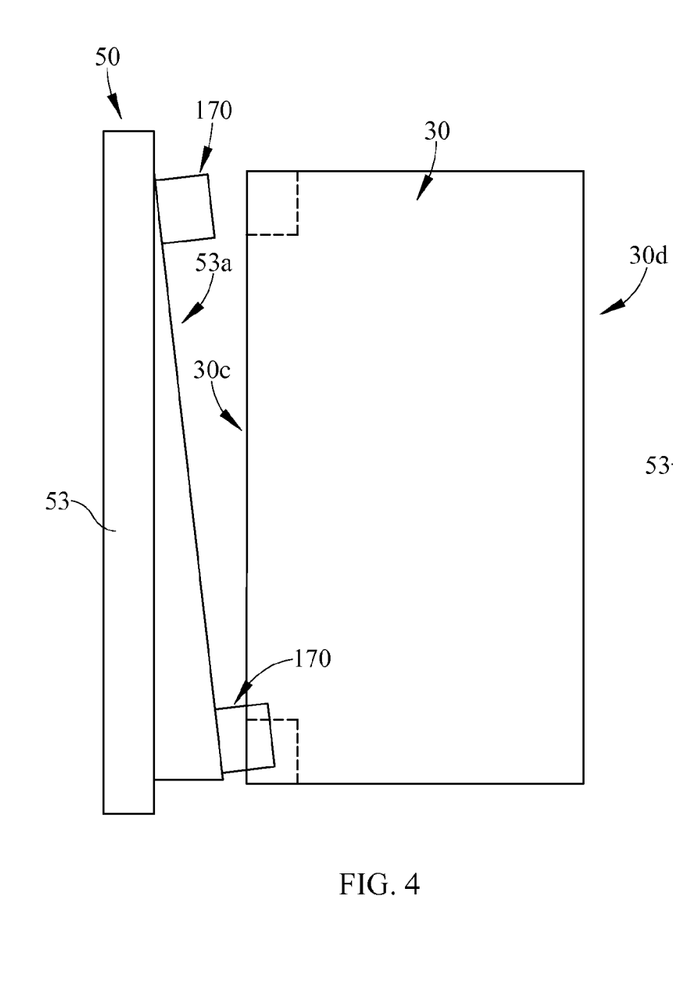
FIG. 4 is a schematic side view of one embodiment of the final filter disengaged from the connection member illustrating no reservoir in the connection member.
Figure 5:
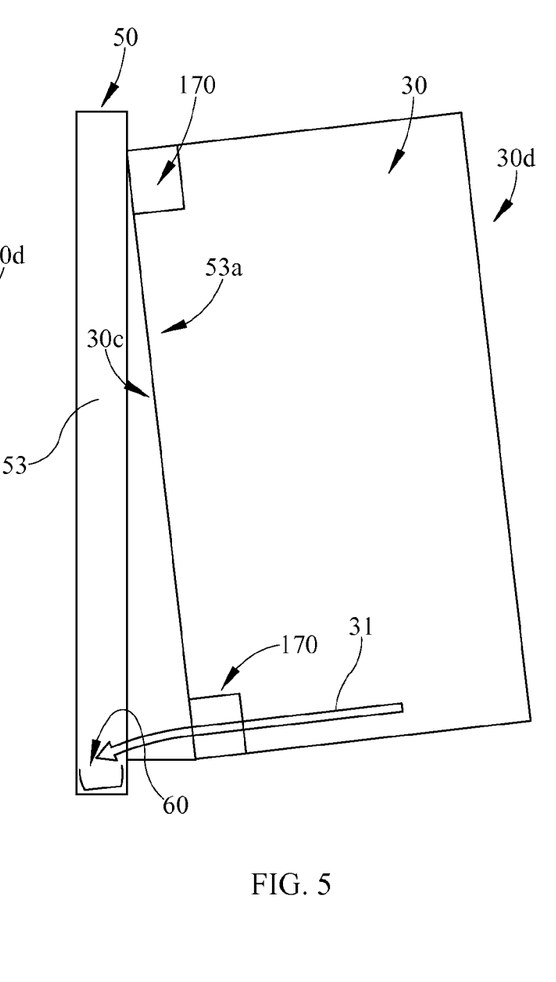
FIG. 5 is a schematic side view of one embodiment of the final filter engaged with the connection member illustrating a reservoir positioned in a different location of the connection member as compared to FIG. 3.
Figure 6:
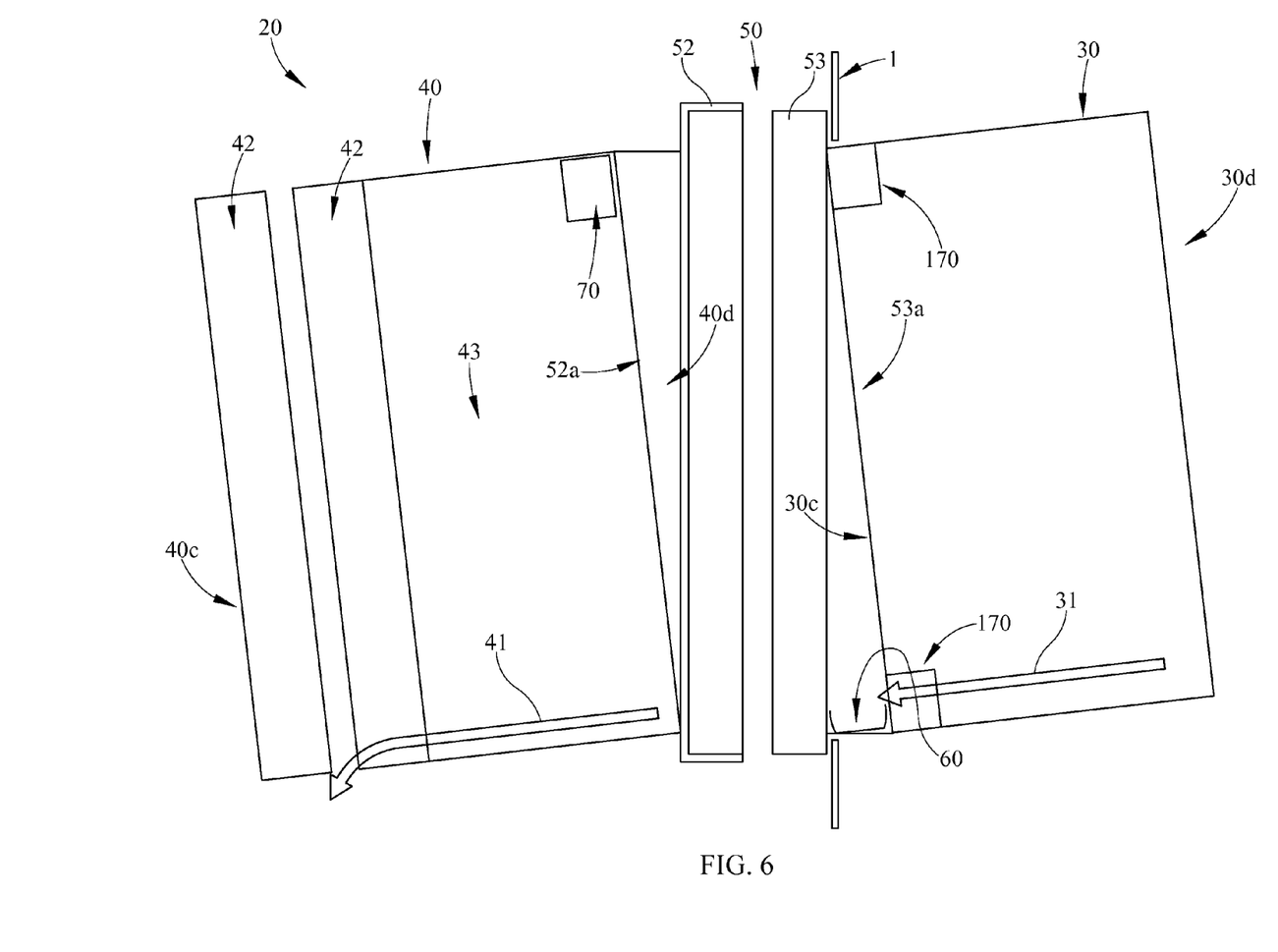
FIG. 6 is a schematic side view of one embodiment of the prefilter and a portion or upstream member of the connection member exploded away from another portion or downstream member of the connection member and final filter.
Figure 7:
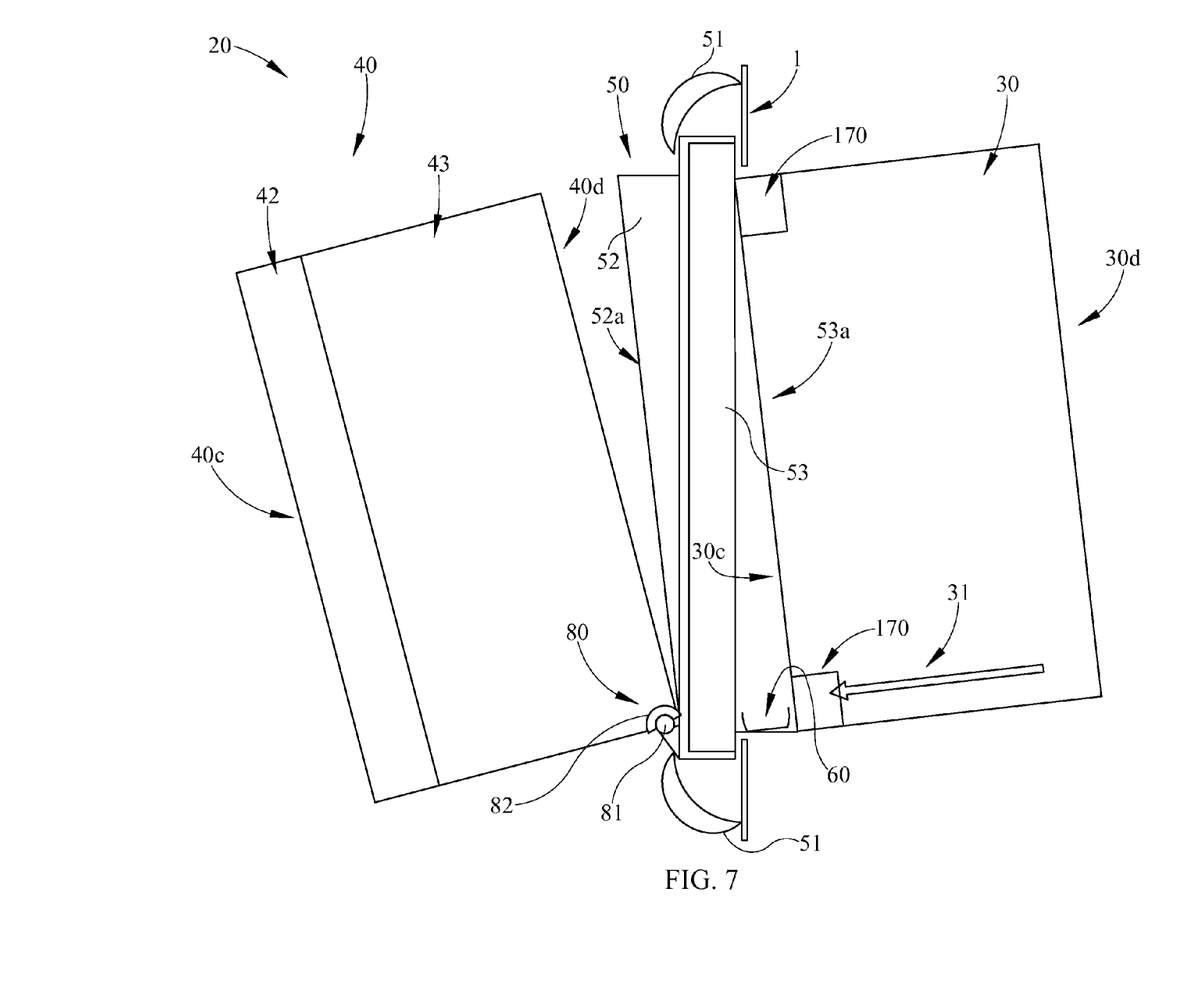
FIG. 7 is a schematic side view of one embodiment of the prefilter in a first rotational and/or unlocked position relative to the connection member that is mounted to the gas turbine filter housing wall.
Figure 8:
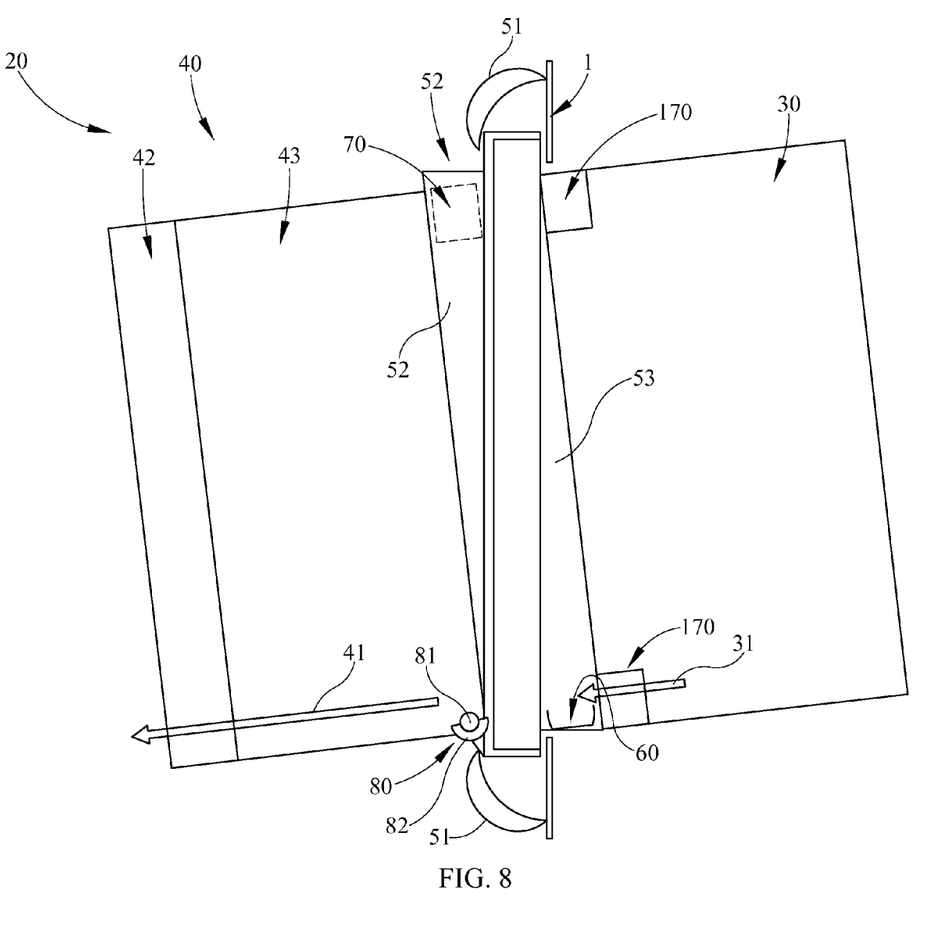
FIG. 8 is a schematic side view of one embodiment of the prefilter rotated to a second rotational and/or locked position relative to the connection member and illustrating another embodiment of a hinge mechanism as compared to the prefilter and connection member as in FIG. 7.

The connection member 50 connects one or more of the prefilter 40 and/or the final filter 30 to the gas turbine filter housing wall or frame 1 at an transverse angle θ relative to the horizontal plane or axis H, such that the one or more filters 40, 30 are angled upwardly in the direction of airflow. A variety of acute angles θ transverse to the horizontal axis may be used. Although shown that both the prefilter 40 and final filter 30 is orientated at the same angle θ, the angle of each filter does not have to be the same. The connection member 50 may be of a unitary construction, although shown in one embodiment as a two piece component. The connection member 50 may include an upstream member 52 and a downstream member 53 assembled together by a male-female connection or nesting relationship. The connection member 50 is mounted to the vertical wall 1 of the gas turbine filter housing by one or more attachments 51. The one or more attachments 51 may be shown as one or more springs or latches positioned on the outer periphery of the connection member providing a pressed fit or sealed engagement of the connection member 50 to the outside surface 2 of the wall 1, it is to be understood that the attachment may be a variety of shapes, sizes, orientations, constructions, and quantities relative to the mounting location or wall which may be used and still be within the scope of the teachings herein. A portion of the connection member 50 may be received by an opening 3 within the wall 1 and while the outer periphery of the connection member 50 is engaged to the surface area of the outside surface 2 surrounding the opening 3. The upstream member 52 may include an upstream opening 52a transverse to a vertical plane or axis V of the connection member 50 or wall 1, and/or the downstream member 53 may include a downstream opening 53a transverse to the vertical axis V of the connection member 50 or wall 1. As a result, the downstream opening 53a or the plane defining the downstream opening is angled relative to the vertical axis V at a transverse angle α such that the downstream opening 53a is orientated upwardly. Similarly, the upstream opening 52a or the plane defining the upstream opening is angled relative to the vertical axis V at a transverse angle α such that the upstream opening 52a is orientated downwardly. A variety of acute angles α transverse to the vertical axis may be used. If both upstream and downstream connection member openings are angled, the downstream opening 53a may be parallel to the upstream opening 52a such that the connection member 50 is generally a parallelogram in shape along the direction of airflow. Moreover, it is to be understood that the angle α of the openings 52a, 53a relative to the vertical axis V do not have to be equal to each other. The upstream opening 52a engages or is in air flow communication with the one or more prefilters 40 while the downstream opening 53a engages or is in air flow communication with the one or more final filters 30. Further, the connection member 50 may be described as including a top side 54, bottom side 55, opposing pair of lateral sides 58 and 59 interconnecting the top side 54 to the bottom side 55, and an upstream facing side 56 and a downstream facing side 57. The upstream facing side 56 is orthogonal to the top side 54, bottom side 55, and pair of lateral sides 58 and 59. The downstream facing side 57 is orthogonal to the top side 54, bottom side 55, and pair of lateral sides 58 and 59. The connection member 50 adjacent the upstream facing side 56 may taper from the top side 54 to the bottom side 55. The upstream facing side 56 may define the upstream opening 52a. Similarly, the connection member 50 adjacent the downstream facing side 57 may taper from the bottom side 55 to the top side 54. The downstream facing side 57 may define the downstream opening 53a. Portions of the connection member 50 may be integral or removable with one or more of the filters 40, 30 upon installation or replacement. The connection member 50 may also include one or more reservoirs 60 and will be discussed in more detail below. As shown in FIGS. 1-3 and 5-8, one embodiment of the reservoir 60 may be positioned adjacent the bottom side 55 and fluidly interconnect with one or more passageways of the apparatus 20. More specifically, the reservoir 60 of the connection member 50 may be adjacent the upstream end of the final filter 30 within the downstream member 53. The connection member 50 may have a variety of connections with the prefilter 40 and/or final filter 30, both removable and nonremovable, and still be within the scope of the teachings herein. One embodiment of the connections therebetween includes the connection member 50 having a rotational engagement with one or more filters. A hinge mechanism 80 allows the prefilter 40 to be rotated from a first rotational or unlocked position (FIG. 7) to a second rotational or locked position (FIGS. 1 and 8). Each hinge mechanism 80 may include a pin 81 and joint 82 relationship. The connection member 50 may include one or the other of a pin 81 and joint 82 while the corresponding filter 40 includes the other portion of the hinge mechanism. The hinge mechanism 80 allows the respective upstream filter 40 to be pivoted about and subsequently engaged at the freely rotating filter end to the connection member 50 by a locking mechanism 70. One such locking mechanism 70 is shown in FIG. 1 and generally depicted in the Figures. If removable filters are used they may be installed or replaced as desired by unlocking the locking mechanism 70 and pivoting back to the unlocked position (FIG. 7). Alternatively, it is to be understood that the connection member need not pivot the filters to engage each other. Although the connection member 50 is shown in detail it is to be understood that the connection member may be of a variety of shapes, sizes, orientations, constructions, and quantities which may be used and still be within the scope of the teachings herein.

As shown in the figures, one or more liquid passageways funnel or direct liquid from a first location to at least a second location since the connection member 50 angles the prefilter 40 and the final filter 30 upwardly in the direction of air flow. The prefilter 40 may include a first passageway 41. The prefilter 40 is connected to an upstream end of the connection member 50 and may include the first passageway 41 draining fluid in a direction from downstream to upstream, against the direction of airflow. The fluid flows within the first passageway 41 and exits the prefilter 40 on the leading edge or upstream end of either the removable prefilter 42 or the mid-range filter 43. For example, the upstream removable prefilter 42 may include a downstream portion of the first passageway 41 in liquid communication with an upstream portion of the first passageway 41 of the mid-range filter 43 such that the bottom wall 40ba of each respective frame 40b of the prefilter 40 work together to drain fluid towards a predetermined location such as the upstream end of the prefilter 40. Moreover coinciding with the angled prefilter 40, the first passageway 41 may be angled or inclined upwardly in the direction of airflow, such that the passageway upstream end is higher than the passageway downstream end to facilitate removal of the water. Also, as shown the first passageway 41 may be positioned at a lower side of the prefilter 40. As shown, the first passageway 41 may be defined at least partially by one or more inclined surfaces, such as but not limited to a bottom wall 40ba of the filter frame 40b, with its passageway upstream end higher than the passageway downstream end. Although the first passageway 41 is shown in detail it is to be understood that the passageway may be of a variety of shapes, sizes, orientations, constructions, and quantities which may be used and still be within the scope of the teachings herein. For example, the passageway can also be any number of lengths, widths, and quantities.

In the embodiment shown, the inclined or angled bottom wall 40ba of the frame 40b coincides with the prefilter 40 being angled relative to the horizontal axis H by the connection member 50. As shown, the prefilter 40 is orientated at a transverse angle θ relative to the horizontal axis H of the connection member 50 such that the first passageway 41 may be orientated with the corresponding angled bottom wall 40ba or surface of the frame 40b. The prefilter 40 is in airflow communication with the downwardly facing upstream opening 52a of the connection member 50 when engaged to the connection member. As a result, when engaged to the downwardly facing upstream opening 52a of the connection member 50, the prefilter downstream opening 40d is upwardly facing while the opposing prefilter upstream opening 40c is downwardly facing. Alternatively described as the openings 40d and 40c are perpendicular to the angled bottom wall 40ba and as a result may be parallel to the upstream opening 52a. As such, the fluid may exit the prefilter 40 at the lower downwardly facing upstream opening 40c. Although the one embodiment shown of the prefilter 40 is rectangular in shape, a variety of shapes may still be used.

The prefilter 40 may releasably connect to the upstream end of the connection member for installation and replacement purposes. Alternatively, the prefilter 40 may be fixed with the connection member 50 or portions thereof as a single component. The releasable connection may be a connection between the prefilter 40 and the connection member 50, such as one or more hinge mechanisms 80 and/or one or more locking mechanisms 70 between the prefilter 40 and the connection member 50. The hinge mechanism 80 may be a pin 81 received by a joint 82. The joint 82 may be an upwardly facing open groove or semicircular structure allowing the prefilter 40 to be rotated about the bottom side 55 of the connection member 50 up to the top side 54 of the connection member 50 and subsequently fixed into an engaged or locked position by the locking mechanism 70. The locking mechanism 70 may be, but is not limited to, a female and male engagement or latches that automatically engage when combining the prefilter to the connection member, subsequent to rotation about the hinge mechanism 80. The pin 81 and joint 82 may be interchangeable between the prefilter 40 and connection member 50 as shown in FIGS. 1, 3, 7, and 8. Although the connection is shown in detail as releasable, the attachments between the prefilter 40 and connection member 50 may be permanent or a variety of shapes, sizes, orientations, constructions, positions, and quantities which may be used and still be within the scope of the teachings herein. For example, the prefilter 40 may not be rotatable relative to the connection member 50 as shown in FIG. 6.

Similarly, the final filter 30 is connected to the downstream end of the connection member 50 and may include a second passageway 31 draining fluid in a direction from downstream to upstream against the direction of airflow. The fluid flows within the second passageway 31 and may exit the final filter 30 on the leading edge or upstream end. The second passageway 31 may be angled or inclined upwardly in the direction of airflow, such that the passageway upstream end is higher than the passageway downstream end. Also, as shown the second passageway 31 may be positioned at a lower side of the final filter 30. As shown, the second passageway 31 may be defined at least partially by one or more inclined surfaces, such as but not limited to a bottom wall 30ba of the frame 30b, with its passageway upstream end higher than the passageway downstream end. Although the second passageway 31 is shown in detail it is to be understood that the passageway may be of a variety of shapes, sizes, orientations, constructions, and quantities which may be used and still be within the scope of the teachings herein. For example, the second passageway 31 can also be any number of lengths, widths, and quantities.

In the embodiment shown, the inclined or angled bottom wall 30ba of the frame 30b coincides with the final filter 30 being angled relative to the horizontal axis H by the connection member 50. As shown, the final filter 30 is orientated at a transverse angle θ relative to the horizontal axis H of the connection member 50 such that the second passageway 31 may be orientated with the corresponding angled bottom wall 30ba or surface of the frame 30b. The final filter 30 is in airflow communication with the upwardly facing downstream opening 53a of the connection member 50 when engaged to the connection member. As a result, when engaged to the upwardly facing downstream opening 53a, the final filter downstream opening 30d is upwardly facing while the opposing final filter upstream opening 30c is downwardly facing. Alternatively described as the openings 30d and 30c are perpendicular to the angled bottom wall 30ba and as a result may be parallel to the downstream opening 53a. As such, the fluid may exit the final filter 30 at the lower downwardly facing upstream opening 30c and be stored in the reservoir 60. Fluid may, but is not limited to, continue through the connection member 50, through the prefilter 40, and/or may be stored in one or more reservoirs 60.

As shown in FIGS. 1-8, the connection member 50, or portions thereof, may be preassembled or fixed with the final filter 30 as a single component. The final filter 30 is shown as permanently attached to the downstream member 53 and inserted or mounted in the wall 1 or opening 3. The one or more attachment mechanisms that secure the final filter 30 to the downstream member 53 are generally depicted as reference 170. The locking mechanism 170 may be a variety of attachments including, but not limited to, adhesive and/or mechanical. One or more of the attachment mechanisms 170 may be internal and/or external to the airflow. Stated alternatively, the attachments may be internal or within the inner periphery or sides of the opening 53a of the downstream member 53. One such internal connection may allow for insertion of the combined connection member 50 and final filter 30 into the opening 3 without interference with the periphery of the wall 1. If externally connected, the attachment mechanism may be at the outer periphery or sides of the downstream member opening 53a. The final filter 40 may also be sealed and/or aligned relative to the connection member 50 when attached. Moreover, the prefilter 40 may also be sealed and/or be aligned relative to the connection member 50. Although the attachment mechanism is generally shown, the attachments or connection between the final filter 30 and connection member 50 may be of a variety of shapes, sizes, orientations, constructions, positions, and quantities which may be used and still be within the scope of the teachings herein. For example and not shown, the final filter may be releasably connected to the connection member 50. Therefore, the final filter 30 may releasably connect to the downstream end of the connection member 50 for installation and replacement purposes. The releasable connection may be one or more hinge mechanisms and/or locking mechanisms between the final filter 30 and the connection member 50. As such, the final filter 30 may be rotatable relative to the connection member 50 similar to the embodiment of the prefilter 40 shown.

Although not shown, the connection member 50 may also include one or more passageways. The passageway of the connection member may or may not be in liquid communication with one or both of the passageways 41, 31 of the upstream or downstream filters 30, 40. It should be understood that the passageways of the connection member and/or one or more upstream or downstream filters may be fluidly connected with one or more upstream or downstream reservoirs relative to the passageways' fluid flow.

One or more reservoirs 60 may be included in the filter apparatus 20. The reservoirs 60 may be positioned in any number of locations in the filter apparatus 20 to receive, permanently or temporarily, fluid from one or more passageways or deliver to one or more passageways. The reservoir 60 may be positioned at variety of locations in relation to one or more passageways, such as but not limited to the upstream end, downstream end, or within a portion of the passageway. In one embodiment shown, one or more reservoirs 60 is positioned within the connection member 50 at the downstream end of the final filter second passageway 31 or lower end of the angled bottom wall 30ba to receive and hold water separated from the final filter 30. As shown, the reservoir 60 may be positioned adjacent the upstream end of the final filter 30 adjacent the bottom side 55 of the connection member 50. Further in FIGS. 1-3, 7, and 8, the reservoir 60 is shown as being positioned downstream of the gas turbine filter housing wall 1 within the downstream member 53. Alternatively, the reservoir 60 may be positioned upstream of the gas turbine filter housing wall 1 as in FIG. 5. One or more reservoirs 60 may extend the width of the final filter 30 or connection member 50, or be discontinuous across the width. One embodiment of the reservoir 60 may be a longitudinal trough defining one or more fluid openings, such as a fluid receiving opening or top opening. Although the reservoir is shown in detail, the reservoir may be of a variety of shapes, sizes, orientations, constructions, quantities, and positions within or external to the filter apparatus 20 and still be within the scope of the teachings herein. For example, the reservoir may include a variety of constructions of fluid openings to receive or dispatch fluid. Further, it is understood that one or more filters may include a reservoir or portions thereof.

Although the passageways 31, 41 are shown in the drawings, it is merely representative of one embodiment, and it is to be understood that there are a variety of shapes, sizes, orientations, constructions, and quantities which may be used and still be within the scope of the teachings herein. For example, the one or more filters 30, 40 and/or the connection members 50 may include one or more passageways. The passageways within the apparatus do not have to be similar to each other. Further two or more passageways within an apparatus may be fluidly connected or disconnected from each other. As shown in the drawings the first passageway 41 of the prefilter 40 may be disconnected from the second passageway 31 of the final filter 30, such that the final filter 30 drains water to a reservoir 60, if used, in the connection member 50. However, the reservoir 60 may subsequently drain to the first passageway 41 through the connection member 50 if desired. Also for example, the final filter second passageway 31 may fluidly connect directly or indirectly with the first passageway 41 of the prefilter 40. Further, the liquid within the filter apparatus 20 may be drained to one or more exterior locations of the filter apparatus, such as but not limited to the upstream end of the prefilter 40, and/or one or more interior locations such as but not limited to the reservoir 60. It is to be understood that liquid may flow to one or more interior locations within the filter apparatus such as to be stored or temporarily stored within the filter apparatus. Also, generally the liquid is directed in a direction opposite to the direction of airflow. Alternatively however, the flow of liquid may travel with the airflow to one or more predetermined positions. Further, the draining of fluid in a direction may be, but is not limited to, automatic such as aided by gravity or directed by other devices or structure.

It is understood that while certain embodiments of the invention have been illustrated and described, it is not limited thereto except insofar as such limitations are included in the following claims and allowable functional equivalents thereof.

We claim:

1. A connection member for positioning one or more filters comprising:
   a top side;
   a bottom side;
   a pair of lateral sides interconnecting said top side and said bottom side;
   an upstream facing side interconnected with said top side, said bottom side, and said pair of lateral sides, wherein said connection member adjacent said upstream facing side inwardly tapers from said top side to said bottom side to define a downwardly facing upstream opening adapted to engage one or more prefilters;
   a downstream facing side interconnected with said top side, said bottom side, and said pair of lateral sides, wherein said connection member adjacent said downstream facing side inwardly tapers from said bottom side to said top side to define an upwardly facing downstream opening adapted to engage one or more final filters;
   wherein said connection member includes said downwardly facing upstream opening in air flow communication with said upwardly facing downstream opening and orientates the one or more final filters or prefilters to assist in draining contaminates from the one or more final filters or prefilters; and
   wherein said connection member is a two piece component that includes an upstream member in a nesting relationship with a downstream member, wherein said upstream member includes said downwardly facing upstream opening and said downstream member includes said upwardly facing downstream opening.

2. The connection member of claim 1 further including one or more reservoirs.

3. The connection member of claim 2 wherein said one or more reservoirs are adjacent said downstream facing side.

4. The connection member of claim 1 further including one or more prefilters upstream of said connection member and one or more final filters downstream of said connection member.

5. The connection member of claim 1 wherein said downstream member includes one or more reservoirs.

6. A filter apparatus comprising:
   one or more prefilters having an upstream opening and a downstream opening;
   one or more final filters having an upstream opening and a downstream opening, said one or more final filters are downstream of said one or more prefilters;
   a connection member having an upstream opening and a downstream opening in air flow communication with said one or more prefilters and said one or more final filters, wherein said connection member is downstream of said one or more prefilters such that said upstream opening of said connection member engages with said downstream opening of said one or more prefilters, and said connection member is upstream of said one or more final filters such that said downstream opening of said connection member engages with said upstream opening of said one or more final filters, whereby air flow enters said upstream opening of said one or more prefilters, flows through said connection member, and exits said downstream opening of said one or more final filters;
   said connection member upstream opening is orientated downwardly facing in relation to the horizontal axis and said connection member downstream opening is orientated upwardly facing relative to the horizontal axis; and
   wherein said upstream opening of at least one of said one or more prefilters and said upstream opening of at least one of said one or more final filters is orientated downwardly facing relative to the horizontal axis and said downstream opening of at least one of said one or more prefilters and said downstream opening of at least one of said one or more final filters is orientated upwardly facing relative to the horizontal axis.

7. The filter apparatus of claim 6 wherein said connection member includes one or more reservoirs.

8. The filter apparatus of claim 7 wherein at least one of said one or more reservoirs is adjacent said connection member downstream opening.

9. The filter apparatus of claim 6 wherein said connection member is a two piece component that includes an upstream member defining said upstream opening and a downstream member defining said downstream opening.

10. The filter apparatus of claim 6 wherein at least one of said one or more prefilters is releasably connected to said connection member.

11. The filter apparatus of claim 6 wherein said connection member includes an upstream facing side and a downstream facing side interconnected with a top side and a bottom side, wherein said connection member adjacent said upstream facing side inwardly tapers from said top side to said bottom side and said connection member adjacent said downstream facing side inwardly tapers from said bottom side to said top side.

12. A filter apparatus comprising:
one or more filters, wherein at least one of said one or more filters includes a frame and filter media defining an upstream opening and a downstream opening, said frame includes at least a bottom wall wherein said upstream opening and said downstream opening are substantially perpendicular to said bottom wall;
a connection member having a body defining an air flow passageway between an upstream opening and a downstream opening of said connection member, wherein at least one of said upstream opening and said downstream opening of said connection member engages said at least one filter to orientate said frame bottom wall at a transverse angle relative to the horizontal axis wherein said upstream opening of said at least one filter is lower than said downstream opening of said at least one filter.

13. The filter apparatus of claim 12 wherein said connection member includes one or more reservoirs.

14. The filter apparatus of claim 12 wherein said at least one filter is a prefilter upstream of said connection member.

15. The filter apparatus of claim 12 wherein said at least one filter is a final filter downstream of said connection member.

16. The filter apparatus of claim 12 wherein at least one of said upstream opening or said downstream opening of said connection member is parallel to said upstream opening and said downstream opening of said at least one filter.

17. The filter apparatus of claim 12 wherein at least one of said one or more filters rotates relative to said connection member between a first rotational position and a second rotational position about a hinge mechanism.

18. The filter apparatus of claim 12 wherein said connection member includes an upstream member and a downstream member, wherein said upstream member includes said upstream opening of said connection member and said downstream member includes said downstream opening of said connection member.

* * * * *